United States Patent [19]

Takeshita

[11] Patent Number: 5,000,302
[45] Date of Patent: Mar. 19, 1991

[54] POWER TRANSMITTING DEVICE FOR WORKING MACHINERY

[75] Inventor: Masatoshi Takeshita, Iwata, Japan

[73] Assignee: Yamaha Hatsudoki Kabushiki Kaisha, Iwata, Japan

[21] Appl. No.: 369,748

[22] Filed: Jun. 22, 1989

[30] Foreign Application Priority Data

Jun. 23, 1988 [JP] Japan .................................. 63-153513

[51] Int. Cl.⁵ ............................................. F16D 67/02
[52] U.S. Cl. ..................................... 192/17 R; 37/245
[58] Field of Search ................ 192/12 R, 17 R, 17 A, 192/17 C, 17 D, 113 B; 37/244, 245; 56/11.3

[56] References Cited

U.S. PATENT DOCUMENTS

| | | | |
|---|---|---|---|
| 1,445,151 | 2/1923 | Mercer | 192/17 R |
| 2,786,560 | 3/1957 | Ishoy | 192/18 R |
| 2,799,182 | 7/1957 | Butler | 192/18 R X |
| 2,899,032 | 8/1959 | Clement | 192/18 R |
| 2,968,198 | 1/1961 | Marsh | 192/18 R X |
| 3,179,217 | 4/1965 | Root | 192/113 B |
| 3,685,371 | 8/1972 | Crooks | 192/18 R X |
| 3,743,070 | 7/1973 | Howard et al. | 192/113 B |
| 4,122,652 | 10/1978 | Holtermann | 56/11.3 |
| 4,255,879 | 3/1981 | Greider | 37/245 |

Primary Examiner—Rodney H. Bonck
Attorney, Agent, or Firm—Ernest A. Beutler

[57] ABSTRACT

A transmission and brake assembly for driving the auger of a snow blower wherein the transmission includes a multiple disk wet clutch and the brake is juxtaposed to this clutch but separated from it by a wall so that the liquid will not adversely effect the frictional brake. An operating mechanism is incorporated that effects release of the brake upon engagement of the clutch and vice versa with a lost motion period wherein both are disengaged.

10 Claims, 7 Drawing Sheets

POWER TRANSMITTING DEVICE FOR WORKING MACHINERY

BACKGROUND OF THE INVENTION

This invention relates to a power transmitting device for working machinery and more particularly to an improved power transmission system for a machine such as a snow blower or the like.

In many forms of power equipment there is provided a transmission for driving a working implement and this transmission includes a selectively engagable and releasable clutch. In many instances, it is desirable that the driven element be braked when the clutch is disengaged. For example, it is the common practice in a snow blower to employ a transmission that incorporates a clutch for selectively driving the auger of the snow blower. However, when the drive to the auger has discontinued, it is also desired to brake the auger from rotation so that it will be held in a stationary position. Frequently the transmissions for such auger drives include a combined clutch and brake assembly within the transmission housing. Although this is desirable from the standpoint of compactness, it is also well known that these types of machines are operated in adverse climates and are not operated continuously. Therefore, it may be the case that the clutch mechanism can become corroded and seize during long periods of inactivity. As a result, disengagement of the clutch can present significant problems. This is particularly true since the type of clutch mechanism normally employed is a multiple disk clutch.

It is, therefore, a principal object of this invention to provide an improved power transmitting device for a working machine.

It is a further object of this invention to provide a power transmitting device including a power transmitting clutch and a brake that is automatically engaged when the clutch is disengaged and a mechanism for operating it.

In connection with such transmissions, if a wet type clutch is employed wherein the clutch operates in a bath of lubricant, then the corrosion problem will not occur. However, the use of such wet type clutches can give rise to problems in lack of efficient operation of the frictional brake since the lubricant of the clutch can adversely effect the brake operation.

It is, therefore, a further object of this invention to provide an improved power transmitting device that employs a wet clutch and frictional brake and which are isolated from each other so that the liquid from the clutch will not adversely effect the operation of the brake.

SUMMARY OF THE INVENTION

This invention is adapted to be embodied in a power transmission comprised of a transmission casing, an input shaft extending through the transmission casing and adapted to be driven by an engine. An output shaft extends through the transmission casing and is adapted to be connected to a working machine for driving the working machine. Transmission means are contained within the transmission casing for driving the output shaft from the input shaft. The transmission means comprises a multiple disk wet clutch contained within the transmission casing. A frictional brake assembly for braking the rotation of the output shaft is contained within the transmission casing, but wall means within the transmission casing seal the frictional brake assembly against contact with the liquid of the wet clutch assembly. Actuating means are provided for operating the multiple disk wet clutch and the friction brake.

DETAILED DESCRIPTION OF THE PREFERRED EMBODIMENT OF THE INVENTION

Figure 1:
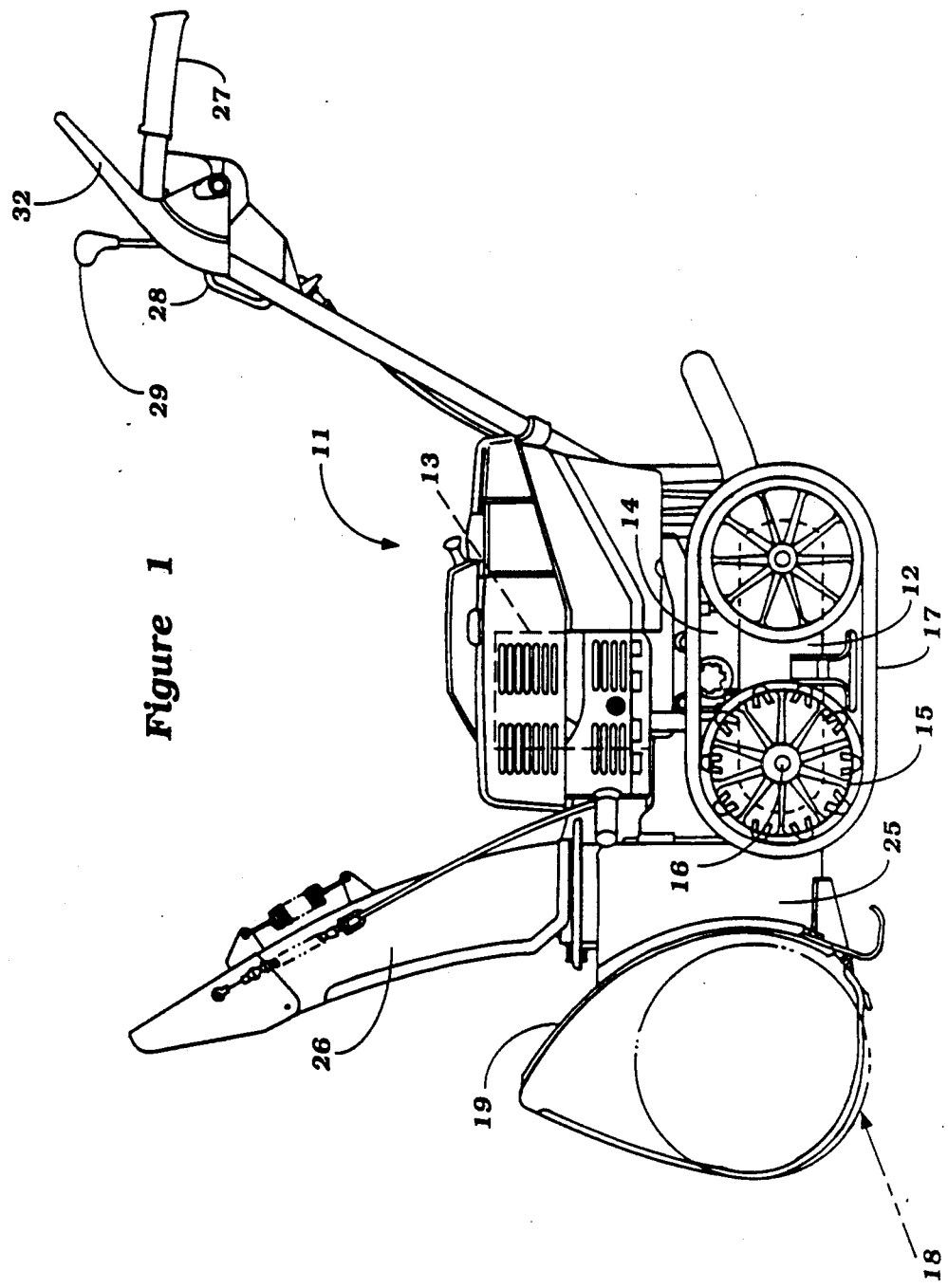
FIG. 1 is a side elevational view of a snow blower constructed in accordance with an embodiment of the invention.
Figure 2:
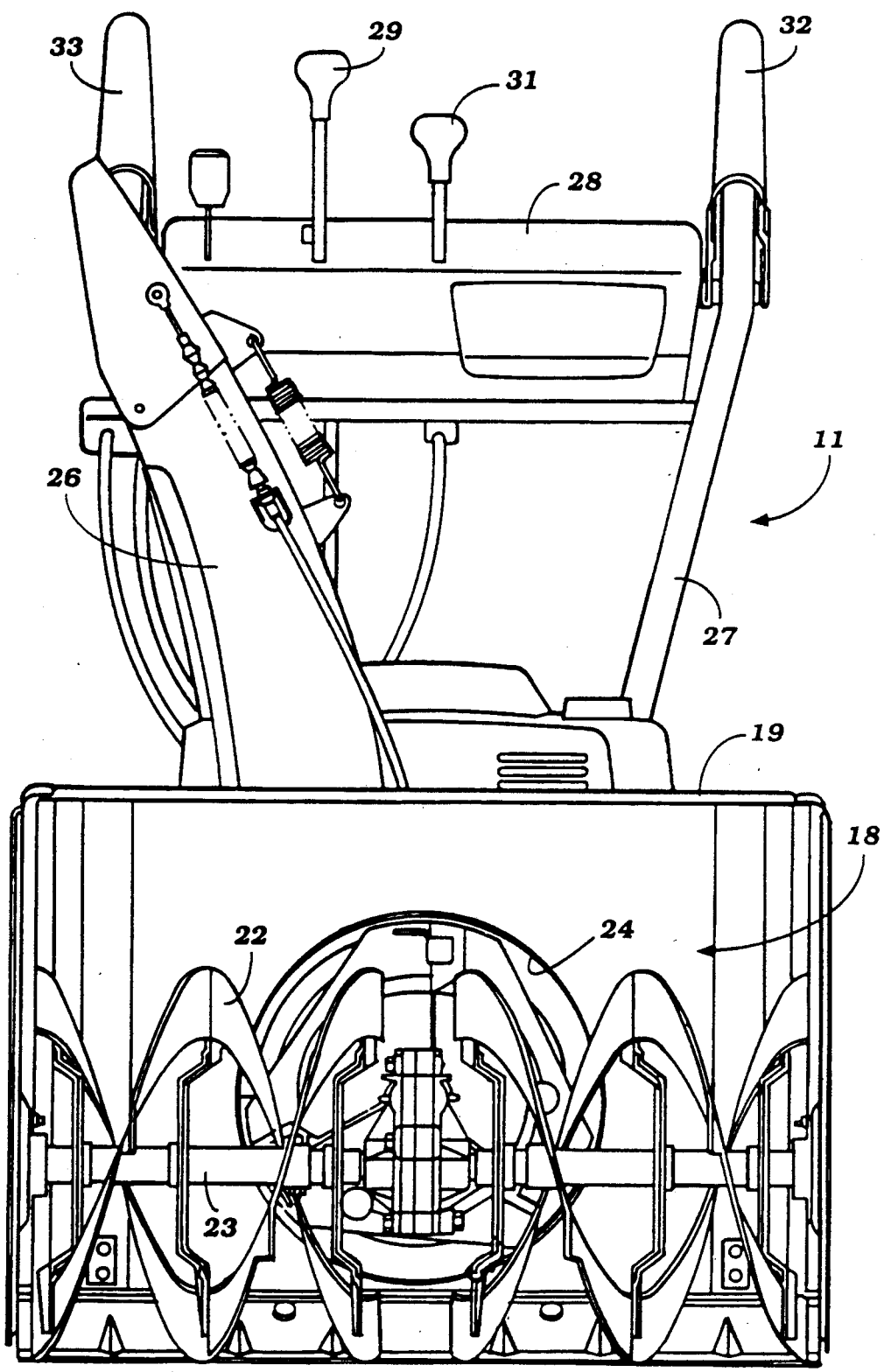
FIG. 2 is a front elevational view of the snow blower on an enlarged scale.

Referring first primarily to FIGS. 1 and 2, a snow blower is indicated generally by the reference numeral 11 and is depicted as a typical form of working machine in which the invention may be practiced. Although the invention is described in conjunction with such a snow blower, the application of the principles of the invention to other forms of working machines will be obvious to those skilled in the art.

The snow blower 11 is comprised of a main body portion 12 that supports an internal combustion engine which may be of any known type and which is shown schematically at 13. As will become apparent, the engine 13 is supported so that its shaft rotates about a vertically extending axis and outputs its power into a transmission, having a casing 14. The transmission 14 drives a drive sprocket 15 by means of an axle shaft 16 for driving a driving track 17. That is, the snow blower 11 is propelled by a track laying type of mechanism.

In addition to driving the track 17, the engine 13 through the transmission 14, drives a forwardly positioned auger 18 that is contained within an auger housing 19. As may be best seen in FIG. 2, the auger 18 is comprised of a pair of auger blades 22 that are affixed for rotation with an auger shaft 23 which is driven from the transmission 12 in a manner to be described. The auger blades 22 transmit snow which enters through the open face of the auger housing 19 to a centrally located discharge opening 24 which, in turn, communicates with an impeller, to be described, contained within an impeller housing 25. The impeller discharges snow through a chute 26 the rotational position of which is controlled in a manner generally to be described.

A handlebar assembly 27 extends rearwardly from the body 12 of the snow blower 11 and upwardly so as to afford control of the snow blower 11 by an operator walking behind it. The handlebar assembly 27 mounts, an operating or control panel 28 on which certain of the controls such as a transmission ratio control lever 29 and engine throttle control 31 are positioned. Supported on the handlebars of the assembly 27 are a transmission clutch control 32 and an auger, impeller clutch control 33.

The drive transmission mechanism for the track 17 and auger 18 and impeller will now be described by particular reference to the remaining figures with initial reference being made primarily to FIGS. 3 and 4. It will be seen that the transmission casing 14 is comprised of a pair of main housing members 34 and 35 which are mated together and fixed together in an appropriate manner. Contained within the housing 34 is a driving bevel gear 36 that is affixed to the vertically extending output shaft 37 of the engine 13 in a known manner. The bevel driving gear 36 drives a compound driven bevel gear 37 and spur gear 38 that are affixed to an input shaft 39. The input shaft 39 is journaled for rotation about a horizontally extending axis that extends generally longitudinally of the snow blower 11 by means of spaced bearing assemblies.

The spur gear 38 meshes with an input spur gear 41 of an infinitely variable forward, neutral, reverse type of transmission, indicated generally by the reference numeral 42. The input gear 41 is affixed to an input shaft 43 which drives an input disk 44. The input disk 44 is engaged with a plurality of planetary rollers 45 that are carried on a spider 46 which is, in turn, affixed to an output shaft 47. The planetary gears 45 are engaged with an axially movable ring 48 that is carried on a transmission ratio control shaft 49 which can be moved longitudinally of the transmission casing 14 under the control of the lever 29. As the ring 48 is moved axially, the ratio of the transmission will be changed from the high speed ratio as shown in the phantom line positions to a low speed ratio as shown in the solid line positions. Continued movement of the ring 48 beyond the low speed condition will create a reverse drive.

A thrust member 51 engages the spider 46 and holds the planetary rollers 45 in engagement with the ring 48.

A spur gear 52 is affixed to the outer end of the transmission output shaft 47 and meshes with a spur gear 53 that is carried on a shaft 54 which is journaled in the transmission casing 35. The shaft 54 drives a worm 55 that is enmeshed with a worm wheel 56 which, in turn, can be rotatably coupled to the axle shaft 16 by means of a dog clutch (not shown) controlled by a shifting fork 57. The shifting fork 57 is operated by the drive clutch control lever 32 aforenoted.

The transmission input shaft 39 also drives an input member 58 of a multiple disk wet clutch assembly, indicated generally by the reference numeral 59. The input member 58 has splined to it a plurality of driving disks 61 which are interdigitated with driven disks 62 which, in turn, have a splined connection to a clutch housing 63. A pressure plate 64 is normally urged by means of coil compression springs 65 that surround bosses 66 of the pressure plate 64 so as to hold the clutch plates 61 and 62 in driving relationship.

The pressure plate 64 may be urged to a released position by means of a throw out member 67 that is engaged with the bosses 66 and which is operated by means of a shifting fork 68 through a throw out bearing 69. The shifting fork 68 is operated by a clutch operating shaft 71 that is released by means of the clutch control lever 33, in a manner to be described.

Figure 7:
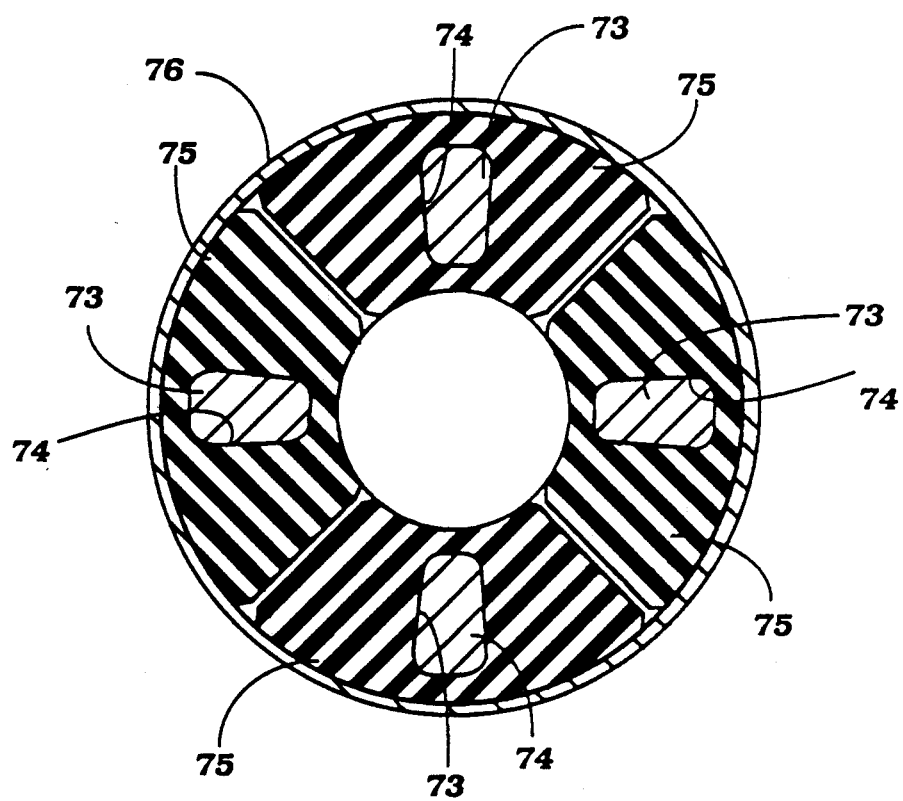
FIG. 7 is a cross-sectional view showing the construction of the torsional damper employed in the connection between the output shaft of the clutch and the input shaft of the transmission for the auger and is taken along the line 7—7 of FIG. 4.

The clutch driven housing 63 is journaled on the input shaft 39 by means of bearings 70. This driven member 63 is connected to an output shaft 72 by means of a torsional damping coupling having a construction as best shown in FIG. 7. As may be seen, the clutch housing 63 has a plurality of axially extending projections 73 that are received within complementary pockets 74 of a plurality of respective elastic pads 75. The elastic pads 75 are affixed, as by bonding, to a bell shaped housing 76 which is, in turn, affixed to the shaft 72 in a suitable manner. The shaft 72 is, in turn, journaled by means of bearings 77 supported in an end wall 78 of the transmission housing 35 and bearings 80. It should be noted that the wet multiple disk clutch 59 is positioned within a cavity 79 formed on the inner side of the wall 78.

Figure 3:
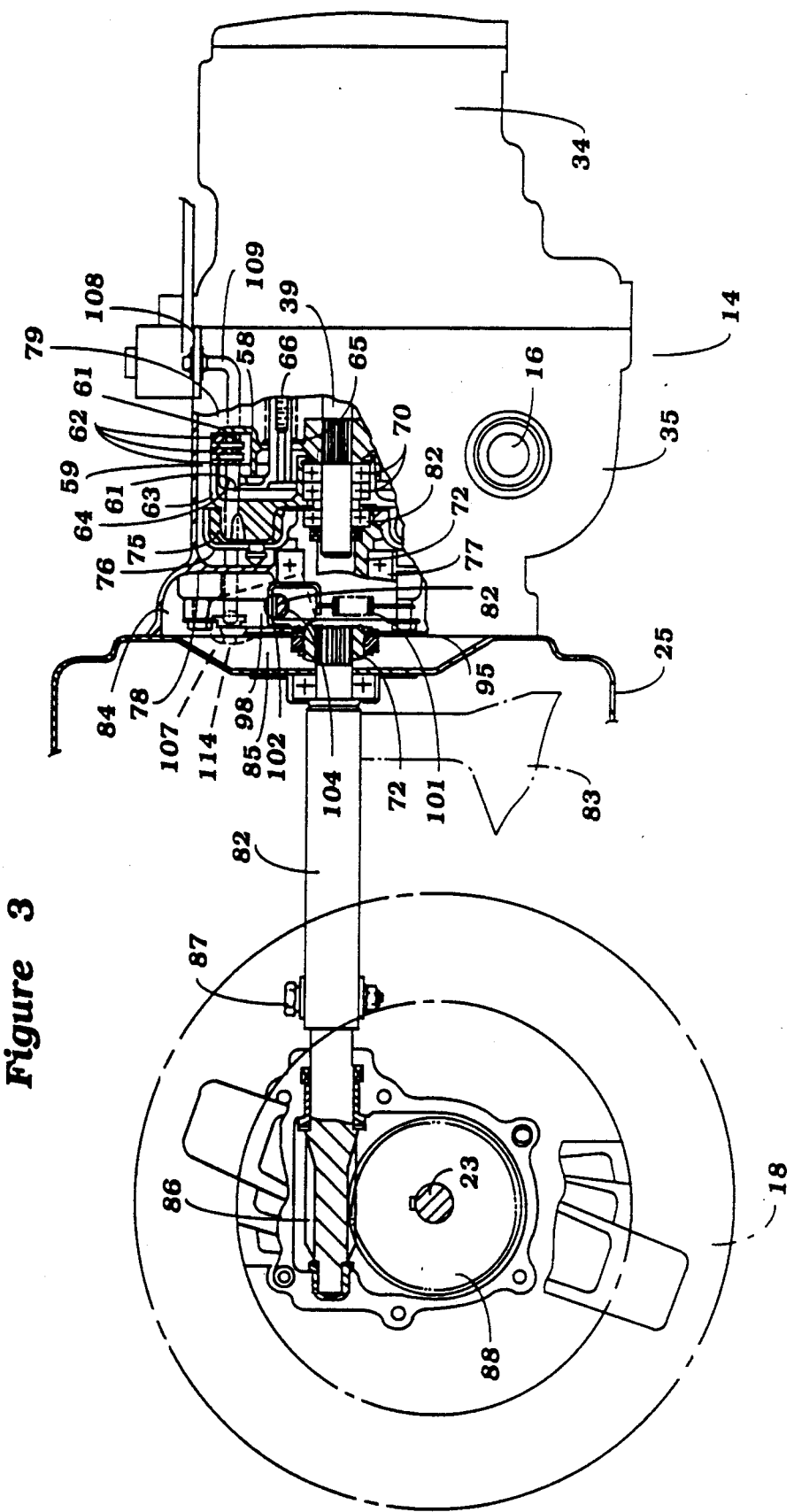
FIG. 3 is a side elevational view, with portions broken away and shown in s on a further enlarged scale, showing the transmission for driving the components of the snow blower.
Figure 4:
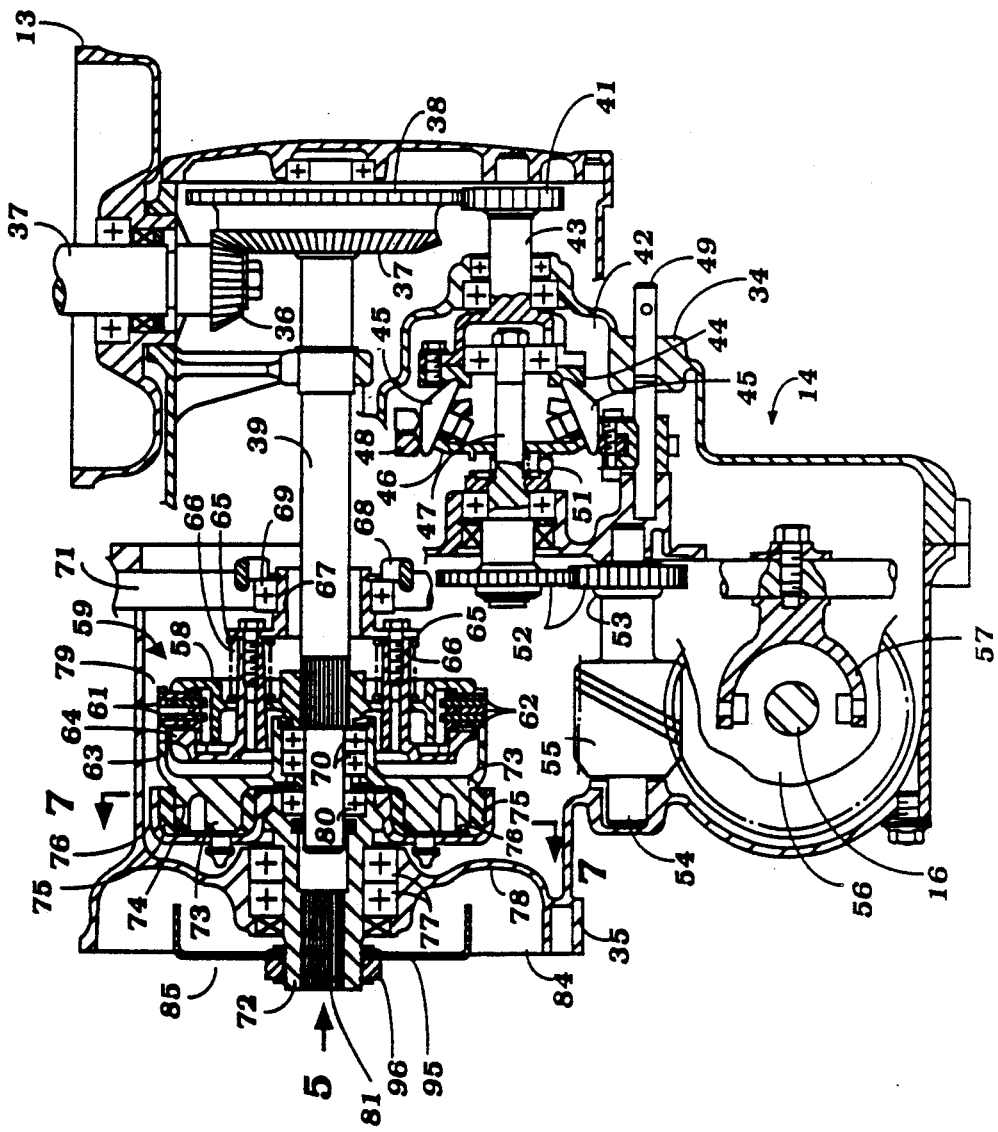
FIG. 4 is a further enlarged cross-sectional view taken through the transmission mechanism of the snow blower.

As best seen in FIGS. 3 and 4, the shaft 72 is provided with an internally splined opening 81 that receives the splined input end of an auger and impeller drive shaft 82. The blower impeller 83 is affixed to the end of the shaft 82 adjacent the shaft 72. It should be noted that the blower housing 25 forms a closure for the end of the transmission casing 14 and thus, with the wall 78 defines a cavity 84 in which a brake assembly, indicated generally by the reference numeral 85, is contained. As will be described, the brake assembly 85 is operated so as to brake the rotation of the auger and impeller drive shaft 82 when the clutch assembly 59 is disengaged.

A worm gear 86 is formed on the end of a shaft which is connected to the auger drive shaft 82 by means of a shear pin 87. The worm 86 is enmeshed with a worm wheel 88 that is connected to the auger shaft 23 by means of a torsional damping coupling like the coupling that connects the clutch 59 to the shaft 72 for driving the auger in a known manner.

Figure 5:
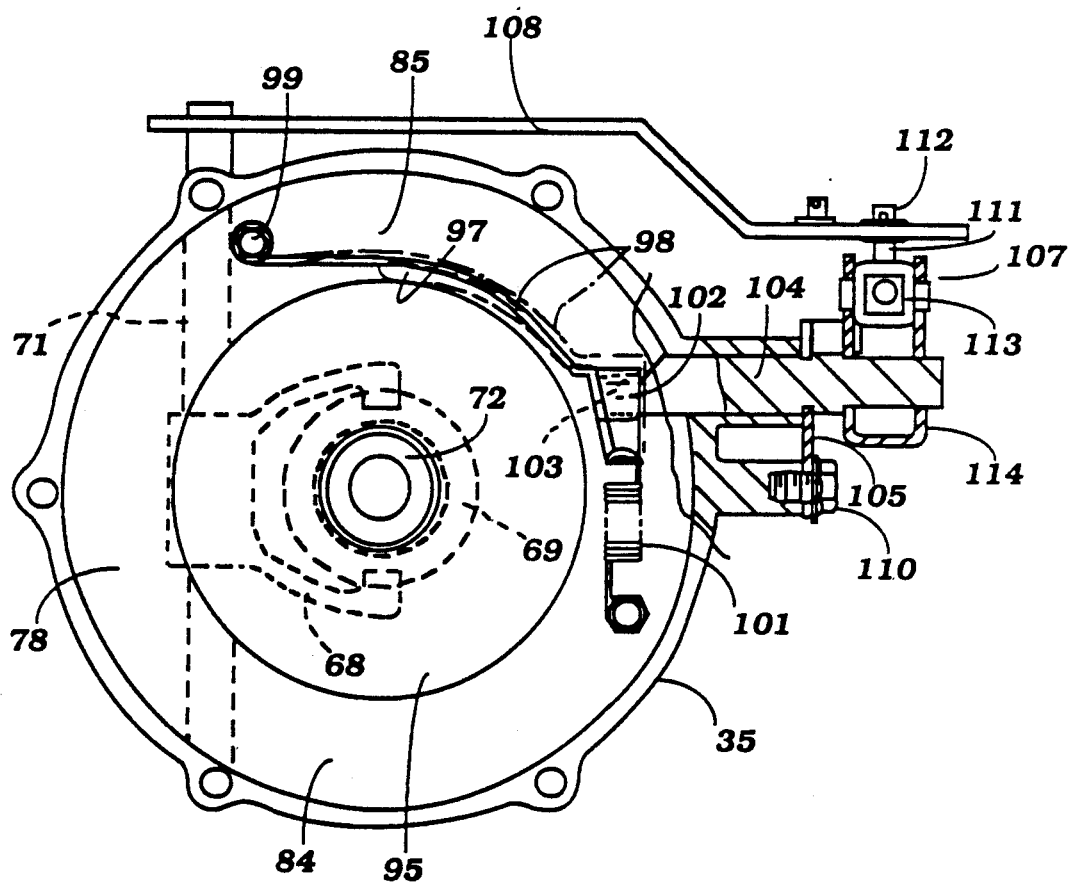
FIG. 5 is an enlarged end elevational view of the transmission mechanism, taken in the direction of the arrow 5 in FIG. 4 and with portions broken away to show the brake operating mechanism and its relationship with the clutch operating mechanism.

Referring now primarily to FIGS. 3 through 5, the frictional brake assembly 85 is comprised of a drum 95 that is affixed for rotation with the shaft 72 by means of a nut 96. The drum 95 has a cylindrical outer surface that is adapted to be engaged by a frictional lining 97 carried by a brake shoe 98. The brake shoe 98 is pivotally supported on the transmission casing 35 by means of a pivot pin 99. A coil compression spring 101 normally urges the brake shoe 98 in a direction so that its frictional lining 97 will engage the cylindrical outer surface of the drum 95 so as to hold the drum 95, shaft 72, impeller 83 and auger 18 against rotation.

As has been noted, a mechanism is provided for interrelating the operation of the brake 85 and clutch 59 so that the brake will be engaged when the clutch is disengaged and vice versa. There is, however, some lost motion in this interconnection, as will be described. This mechanism includes a cam recess 102 that is formed by an extending portion of the brake shoe 98. A cam shaped surface 103 of an actuating shaft 104 is received within this recess 102. The shaft 104 is journaled within the transmission housing 35 and is held in place axially by means of a retainer plate 105 and threaded fasteners 110. The retainer plate 105 is also formed with an outwardly extending tang 106, for a purpose to be described.

A link mechanism, indicated generally by the reference numeral 107, is provided for interrelating the operation of the clutch 59 and brake 85. This linkage 107 includes a lever arm 108 that is affixed to the clutch operating lever 71 and which rotates with it. A link 109 has an upstanding arm 111 that is received within an opening in this lever 107 and which is held in place by a cotter pin 112. The link 109 has a further portion that is connected by means of a clevice 113 to a yoke 114 that is affixed to the end of the shaft 104.

Figure 6:
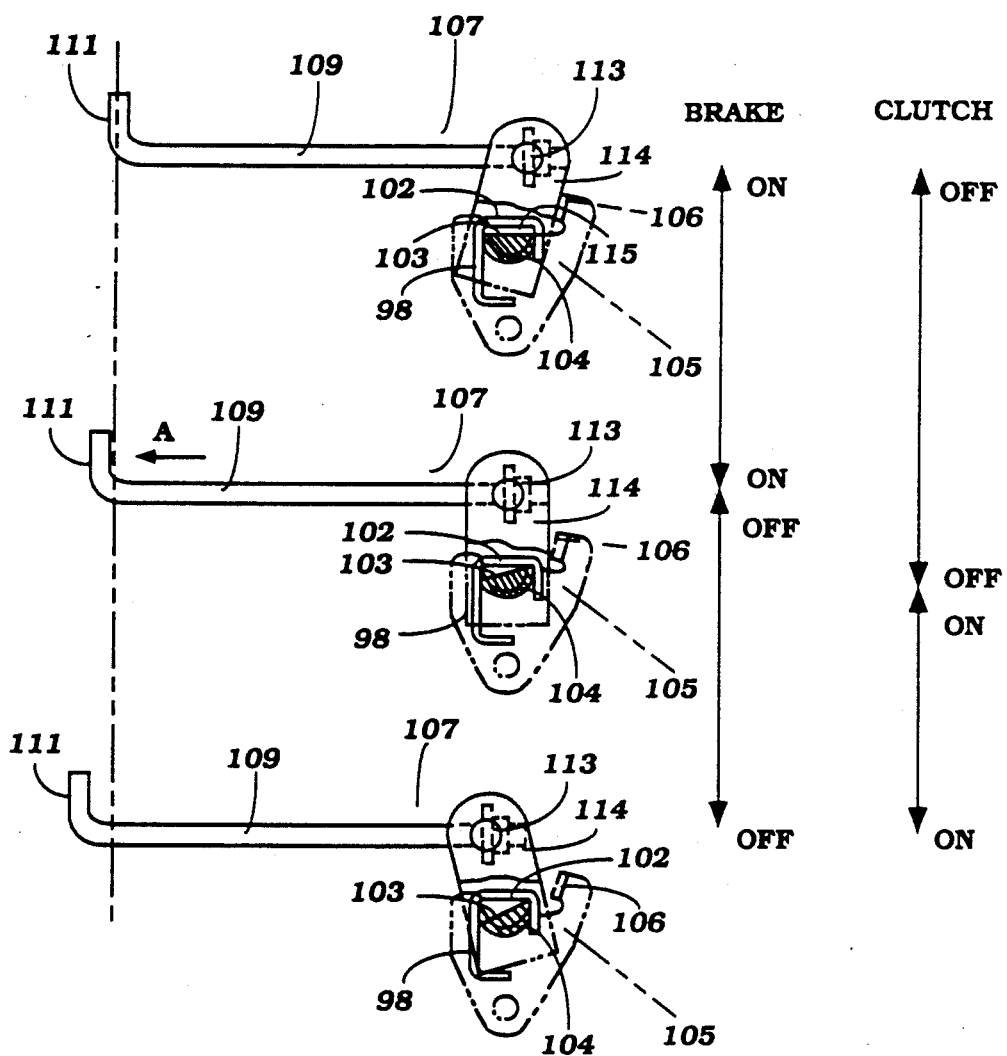
FIG. 6 is a sequential view showing the construction of the clutch and brake operating mechanism shown in varying positions.

The sequence of operation between the brake and the clutch may be best understood by reference to the sequential and graphical view of FIG. 6. The top view shows the position of the linkage 107 when the clutch 59 is disengaged and the auger 18 and impeller 83 are not being driven. As may be seen, the linkage assembly 107 is in a position whereby the yoke 114 and shaft 104 are such that the cam surface 103 is spaced from the recess 102 and the yoke 114 engages the tang 106. There is a lost motion gap 115 in this condition. As may be seen, when the clutch operating shaft 71 is operated by the clutch control handle 33, the link 109 will be drawn to the left and rotate the yoke 114 and shaft 104 in a counterclockwise direction. After sufficient rotation has occurred so as to take up the lost motion gap 115, the brake shoe 85 will begin to be pivoted from the engaged position toward its released position during the time when the clutch is still disengaged. Thus, the brake will become disengaged before the clutch is engaged. Upon continued movement to the lower position shown in FIG. 6, the brake will continue to be held in its off condition while the clutch is engaged. As a result, there is some lost motion and it will be insured that the clutch and brake are not both on at the same time.

Release of the clutch and engagement of the brake occurs in the opposite sense and it is believed to be readily apparent how this operation occurs. Again, the clutch will be fully released before the brake is engaged.

It should be readily apparent from the foregoing description that a very effective arrangement is provided for simultaneously connecting both a clutch and brake to the same shaft and wherein a wet type clutch can be employed without adverse operation of the frictional brake. Although an embodiment of the invention has been illustrated and described, various changes and modifications may be made without departing from the spirit and scope of the invention, as defined by the appended claims.

I claim:

1. A power transmission comprised of a transmission case, an input shaft extending into said transmission casing through a wall thereof and being adapted to be driven by an engine, an output shaft contained in part in said transmission casing and extending through a wall of said transmission casing and adapted to be connected to a working machine for driving said working machine, transmission means contained within said transmission casing for driving said output shaft from said input shaft, said transmission means comprising intermeshing gears and a multiple disk wet clutch contained within said transmission casing, a frictional brake assembly for braking the rotation of said output shaft and contained at least in part within said transmission casing, wall means within said transmission casing for sealing said friction brake assembly against communication with the liquid of said wet clutch assembly, and actuating means for operating said multiple disk wet clutch and said friction brake.

2. A power transmission as set forth in claim 1 wherein said actuating means comprises a single operator which operates both the multiple disk wet clutch and the friction brake.

3. A power transmission as set forth in claim 2 wherein the actuating means is movable between a first position wherein the multiple disk clutch is released and the friction brake is engaged and a second position wherein the multiple disk clutch is engaged and the frictional brake is released.

4. A power transmission as set forth in claim 3 wherein the actuating means provides an intermediate condition wherein the multiple disk wet clutch is disengaged and the friction brake is disengaged.

5. A power transmission as set forth in claim 1 further including drive means for a vehicle driven by the power transmission.

6. A power transmission for a snow blower including a snow moving implement contained within a housing, said transmission being comprised of a transmission casing, an input shaft extending into said transmission casing through a wall thereof and being adapted to be driven by an engine, an output shaft contained in part in said transmission casing and extending through a wall of said transmission connected to said snow moving implement for driving said snow moving implement, transmission means contained within said transmission casing for driving said output shaft from said input shaft, said transmission means comprising a multiple disk wet clutch contained within said transmission casing, a frictional brake assembly for braking the rotation of said output shaft and contained at least in part within said transmission casing, wall means within said transmission casing cooperating with said housing defining a casing receiving said friction brake assembly for sealing said friction brake assembly against communication with the liquid of said wet clutch assembly, and actuating means for operating said multiple disk wet clutch and said friction brake.

7. A power transmission as set forth in claim 6 wherein said actuating means comprises a single operator which operates both the multiple disk wet clutch and the friction brake.

8. A power transmission as set forth in claim 7 wherein the actuating means is movable between a first position wherein the multiple disk clutch is released and the friction brake is engaged and a second position wherein the multiple disk clutch is engaged and the frictional brake is released.

9. A power transmission as set forth in claim 8 wherein the actuating means provides an intermediate condition wherein the multiple disk wet clutch is disengaged and the friction brake is disengaged.

10. Claim 10 depends on claim 6 wherein the transmission further drives means for powering the snow blower for moving the snowblower along a surface to be cleared.

* * * * *